(12) United States Patent
Smith

(10) Patent No.: US 6,724,593 B1
(45) Date of Patent: Apr. 20, 2004

(54) REVERSE CHARGER PROTECTION

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 3 days.

(21) Appl. No.: 10/066,427

(22) Filed: Jan. 30, 2002

(51) Int. Cl.[7] .............................. H02H 3/42; H02H 3/20
(52) U.S. Cl. ........................................ 361/84; 361/93.2
(58) Field of Search ............................... 361/84, 85, 93, 361/93.2, 82; 320/134, 132, 136, 128, 152

(56) References Cited

U.S. PATENT DOCUMENTS

| | | | | |
|---|---|---|---|---|
| 4,546,302 A | * | 10/1985 | Smith ........................ 320/163 |
| 5,039,931 A | * | 8/1991 | Wieland ...................... 320/104 |
| 5,471,128 A | | 11/1995 | Patino et al. ................... 320/13 |
| 5,504,411 A | | 4/1996 | McCaleb et al. ............... 320/2 |
| 5,546,264 A | | 8/1996 | Williamson et al. ........... 361/84 |
| 5,767,659 A | | 6/1998 | Farley ......................... 320/106 |
| 5,982,149 A | | 11/1999 | Shih ............................ 320/134 |
| 6,154,081 A | | 11/2000 | Pakkala et al. ............... 327/309 |

* cited by examiner

*Primary Examiner*—Rajnikant B. Patel
(74) *Attorney, Agent, or Firm*—Mark R. Hennings; Merchant & Gould

(57) ABSTRACT

A method and apparatus is provided for protecting voltage regulation circuits and battery cells ("cell") when a cell is reverse-coupled to a charger. When a charger is reverse-coupled to the cell, parasitic devices in voltage regulation circuits become forward-biased. When the parasitic devices become forward-biased, the parasitic devices may carry a current that is sufficiently large to damage the voltage regulation circuits. A shunt regulator is used to detect the presence of a reverse-coupled charger ("reverse charger") and to shunt current to a ground potential such that potentially damaging currents are prevented from flowing through the parasitic devices.

22 Claims, 4 Drawing Sheets

US 6,724,593 B1

REVERSE CHARGER PROTECTION

FIELD OF THE INVENTION

The present invention relates generally to protection circuits for rechargeable batteries, and more particularly to a protection circuit for preventing potentially destructive reverse currents that may result when a battery is "plugged backwards" (i.e., inserted with a reverse polarity) into a battery charger.

BACKGROUND OF THE INVENTION

Many portable electronic devices use a rechargeable battery to provide power. These devices include computers, cellular telephones, pagers, radios, and the like. While there are many types of rechargeable batteries used today, including nickel cadmium and nickel metal hydride, lithium ion batteries have become a popular choice. Lithium ion batteries are typically smaller and lighter than other rechargeable battery types while charge capacity is increased.

The charging of lithium ion batteries is conducted in a different manner than the charging of nickel type rechargeable batteries. Generally, nickel-type rechargeable batteries are charged by applying a constant current from a battery charger until the cell reaches a predetermined voltage or temperature. A lithium ion cell, however, uses a different charging process. First, the lithium ion cell is supplied with a current from a battery charger until the cell's voltage rises above a threshold. Next, the battery charger is held at the threshold until the current of the cell decreases to a predetermined level.

Therefore, the battery charger should be selected (and operated) according to the type of battery that is to be charged, and care taken to ensure proper polarity of connections of the battery to the charger. Failure to do so may result in damage to at least the battery or battery charger.

SUMMARY OF THE INVENTION

The present invention is directed to an apparatus and method that prevents potentially destructive reverse currents in latent parasitic semiconductor devices found in a voltage regulator. More specifically, a protection circuit detects that a battery cell has been inserted into the battery charger with a reversed polarity, and prevents unsafe levels of current from flowing through parasitic semiconductor devices that are forward-biased as a result of the reversed polarity.

According to one aspect of the invention, a charge input circuit is arranged to provide a charging signal. An overvoltage protection circuit is coupled to the charging signal. A reverse-voltage protection circuit is arranged to determine when a cell has been inserted into the battery charger with a reversed polarity. The reverse-voltage protection circuit is arranged to prevent the charging signal from causing a parasitic body diode in the over-voltage detection circuit to conduct a potentially destructive reverse current when the reverse-coupled cell is detected.

According to another aspect of the invention, a protection circuit is arranged to compare a voltage of the charging signal to a maximum-allowable reverse-voltage reference. A fault condition is detected when a reverse-voltage is present and the reverse-voltage exceeds the maximum-allowable reverse-voltage. The reverse-voltage is reduced to prevent conduction by parasitic devices that are present in the charge input circuit when the fault condition is detected.

According to another aspect of the invention, the over-voltage protection circuit and the reverse-voltage protection circuit are arranged to control one or more shunt transistors. The shunt transistors are arranged to shunt current from the charging signal to ground whenever the charging signal voltage falls outside of the range defined by the maximum-allowable forward-voltage and the maximum-allowable reverse-voltage.

DETAILED DESCRIPTION OF THE PREFERRED EMBODIMENT

Figure 1:
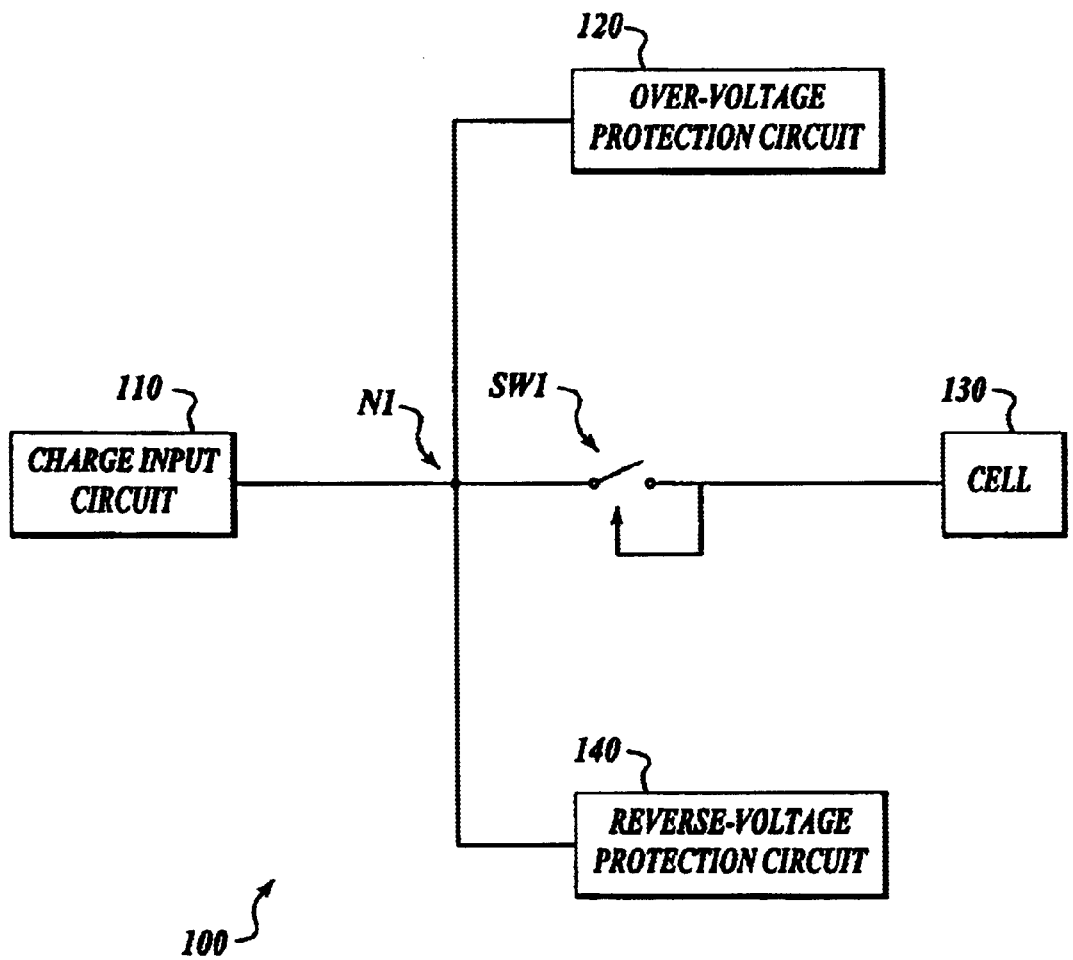
FIG. 1 shows an overview schematic of a reverse charger protection system in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "battery" includes single cell batteries and multiple cell batteries. Referring to the drawings, like numbers indicate like parts throughout the views.

The present invention is directed to a method and apparatus that protects voltage regulation circuits and battery cells ("cell") when a cell is reverse-coupled to a charger. When a cell is reverse-coupled to the charger, parasitic devices in voltage regulation circuits become forward-biased. When the parasitic devices become forward-biased, the parasitic devices may carry a current that is sufficiently large to damage the voltage regulation circuits. A shunt regulator is used to detect the presence of a reverse-coupled charger ("reverse charger") and to shunt current to a ground potential such that potentially damaging currents are prevented from flowing through the parasitic devices.

FIG. 1 shows an overview schematic of a reverse charger protection system in accordance with the present invention. As shown in the figure, reverse charger system 100 includes charge input circuit 110, over-voltage protection circuit 120, cell 130, an optional switch circuit SW1, and reverse-voltage protection circuit 140.

Charge input circuit 110 has a port that is arranged to provide a charging signal to node N1. Over-voltage protection circuit 120 is coupled to node N1. Cell 130 is coupled to switch circuit SW1. Switch circuit SW1 is an over-current protection switch circuit that is coupled between node N1 and cell 130. Reverse-voltage protection circuit 140 is coupled to node N1.

In one embodiment of the invention, protection circuits 120 and 140 and switch circuit SW1 are physically located within charge input circuit 110. In another embodiment, protection circuits 120 and 140 and switch circuit SW1 may be physically located with cell 130. For example, switch circuit SW1 and protection circuit 120 might be physically located within charge input circuit 110, and protection circuit 140 might be physically located within cell 130.

According to one embodiment of the invention, cell 130 is a lithium ion cell. The cell, however, may be any type of rechargeable battery cell. For example, according to other embodiments, cell 130 may be nickel cadmium or nickel metal hydride.

Charge input circuit 110 is arranged to provide a charging signal to cell 130 when switch circuit SW1 is closed. Charge input circuit 110 may be a "legal" or an "illegal" charger. A legal charger is a charger that is suitable for charging a particular cell. For example, a suitable charging signal for a lithium ion cell has a voltage of 4.1 V. An illegal charger is a charger that would exceed the capabilities of a particular cell when charged by the illegal charger. Additionally, charge input circuit 110 may be reverse-coupled to cell 130 such that the reverse-coupled charge input circuit 110 ("reverse charger") presents the wrong polarity to cell 130. Accordingly, using an illegal charger inserted with a reverse polarity might result in providing a high magnitude signal of the wrong polarity to a particular cell that is to be charged.

Initially, a reverse charger acts to pull current away from cell 130, rather than to push current into cell 130. In this situation, the maximum discharge rate of cell 130 is typically exceeded. Switch circuit SW1, upon detecting this condition, typically opens such that cell 130 is prevented from being overdischarged. In various embodiments, switch circuit SW1 may be manually or automatically reset. According to one embodiment of the invention, switch circuit SW1 is a circuit breaker circuit that opens on an overcurrent, overvoltage, or overtemperature event. Switch circuit SW1 may be configured to open only in response to an overcurrent or overvoltage event that occurs when current is flowing towards the reverse charger. If switch circuit SW1 is not present, "shorted out," slow to respond, or otherwise inoperative, the reverse current could potentially damage the cell, charger, or both.

In normal operation (i.e., when a proper legal charger is applied), over-voltage protection circuit 120 prevents cell 130 from being overcharged. In one embodiment, over-voltage protection circuit 120 compares the voltage at node N1 against an over-voltage threshold ("maximum-allowable forward-voltage"). For example, a maximum-allowable forward-voltage for a lithium ion cell may be set to 4.3 V. In other embodiments, comparisons may be made using measurements of node N1 using charge, current, field strength, and the like. The over-voltage protection circuit 120 is arranged to lower the voltage at node N1 when the maximum-allowable forward-voltage is exceeded. In various embodiments, the over-voltage protection circuit 120 may include a shunt for lowering the voltage of node N1. The shunt may be implemented using a Zener diode, a comparator-controlled switch circuit, a feedback-controlled amplifier, and the like.

A reverse charger will reverse-bias over-voltage protection circuit 120 when coupled to node N1. Latent parasitic devices in the semiconductor substrate of over-voltage protection circuit 120 become forward-biased when the reverse charger is active. Thermal damage or "latchup" may occur when the parasitic devices are forward-biased. Thermal damage may occur when, for example, a body diode of a MOS device in over-voltage section circuit 120 conducts a reverse current from node N1 to the substrate, which is typically at ground potential. The parasitic devices found in MOS circuits have high junction resistances. Current flowing through such junctions may dissipate a relatively large amount of power within a small area, thus damaging a MOS device. SCR-type latchup may also occur between adjacent parasitic NPN and PNP devices. Latched high current flow that may lead to damage in MOS devices or reverse chargers.

Reverse-voltage protection circuit 140 acts to detect the presence of reverse chargers and to prevent thermal damage or latchup that might occur if switch circuit SW1 is not present, "shorted out," slow to respond, or otherwise inoperative. Reverse-voltage protection circuit 140 compares the voltage at node N1 against a negative voltage threshold ("maximum-allowable reverse-voltage"). The reverse-voltage protection circuit 140 starts to regulate the voltage at node N1 when the voltage at node N1 is more negative than the maximum-allowable reverse-voltage. The regulation prevents the voltage at node N1 from forward-biasing parasitic devices. In various embodiments, the reverse-voltage protection circuit 140 may be implemented as a comparator-controlled switch circuit, a feedback-controlled amplifier, or the like. The maximum-allowable reverse-voltage is selected to ensure that the reverse-voltage protection circuit 140 prevents the voltage at node N1 from exceeding the forward-conduction voltage for the parasitic devices. For example, if the expected forward-conduction threshold of typical reverse-biased parasitic semiconductor devices is around −600 mV, the maximum-allowable reverse-voltage may be set to −200 mV. A maximum-allowable reverse-voltage of −200 mV allows a margin of 400 mV in which the reverse-voltage protection circuit 140 may use to respond to a reverse charger.

Figure 2:
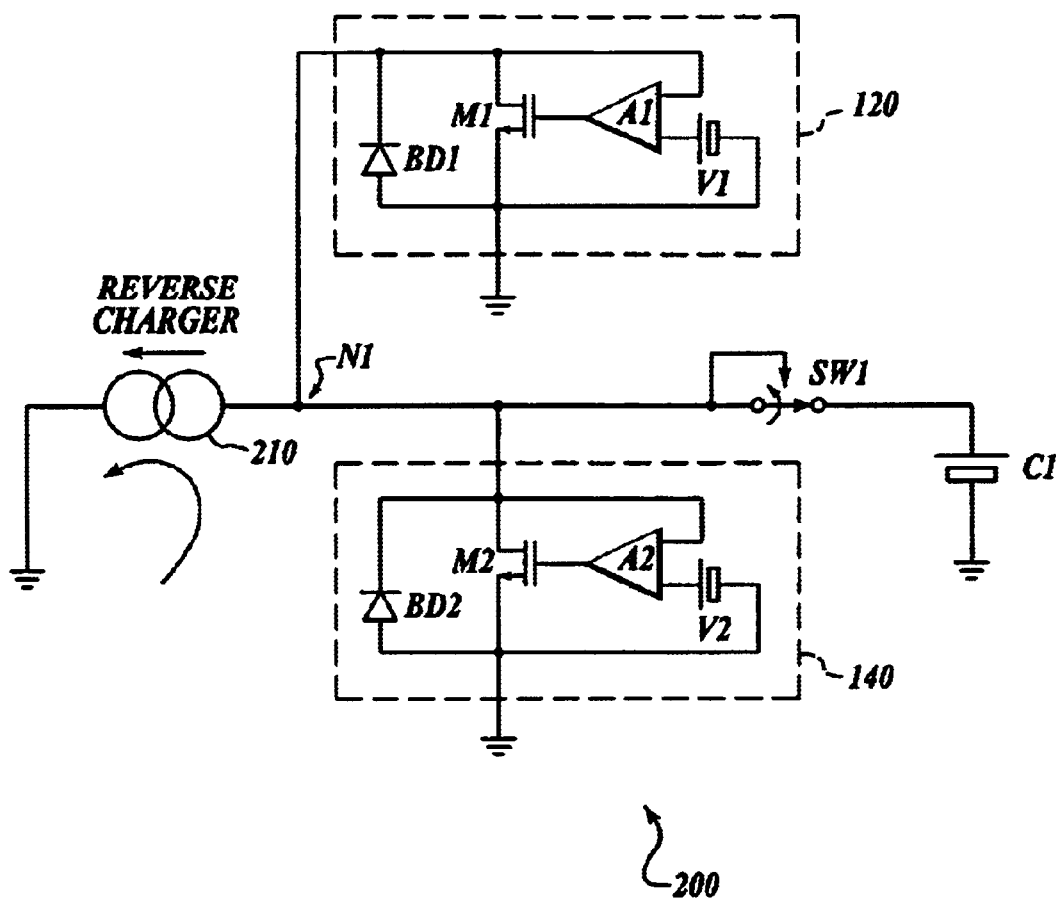
FIG. 2 shows a schematic diagram of an example reverse charger protection circuit 200 for a rechargeable battery in accordance with the present invention.

FIG. 2 shows schematic diagram of an example reverse charger protection circuit 200 for a rechargeable battery in accordance with the present invention. Reverse charger protection circuit 200 includes transistors M1–M2, body diodes BD1–BD2, amplifiers A1–A2, voltage references V1–V2, switch circuit SW1, and rechargeable lithium ion cell C1. The reverse charger 210 is coupled between node N1 of reverse charger protection circuit 200 and ground. Transistor M1 has a drain that is coupled to node N1, a source that is coupled to ground, and a gate that is coupled to the output of amplifier A1. Body diode BD1 is a parasitic diode formed by the drain-to-substrate junction of transistor M1 and is represented as a diode with a cathode coupled to node N1 and an anode coupled to ground. Amplifier A1 has an output that is coupled to the gate of transistor M1, a first input that is coupled to node N1, and a second input that is coupled to voltage reference V1. Voltage reference V1 is coupled between the second input of amplifier A1 and ground. Transistor M2 has a drain that is coupled to node N1, a source that is coupled to ground, and a gate that is coupled to the output of amplifier A2. Body diode BD2 is a parasitic diode formed by the drain-to-substrate junction of transistor M2 and is represented as a diode with a cathode coupled to node N1 and an anode coupled to ground. Amplifier A2 has an output that is coupled to the gate of transistor M2, a first input that is coupled to node N1, and a second input that is coupled to voltage reference V2. Voltage reference V2 is coupled between the second input of amplifier A2 and ground. Switch circuit SW1 is coupled between node N1 and cell C1. Cell C1 is coupled between switch circuit SW1 and ground.

Although transistors M1 and M2 are shown as NMOS devices, transistors M1 and M2 may be NPN transistors, PNP transistors, Bipolar devices, MOS devices, GaAsFET devices, JFET devices, and even one or more components that are arranged to provide the function of transistors M1 and M2 in the above described example. In another embodiment, the function of transistors M1 and M2 may be accomplished with one transistor.

Figure 3:
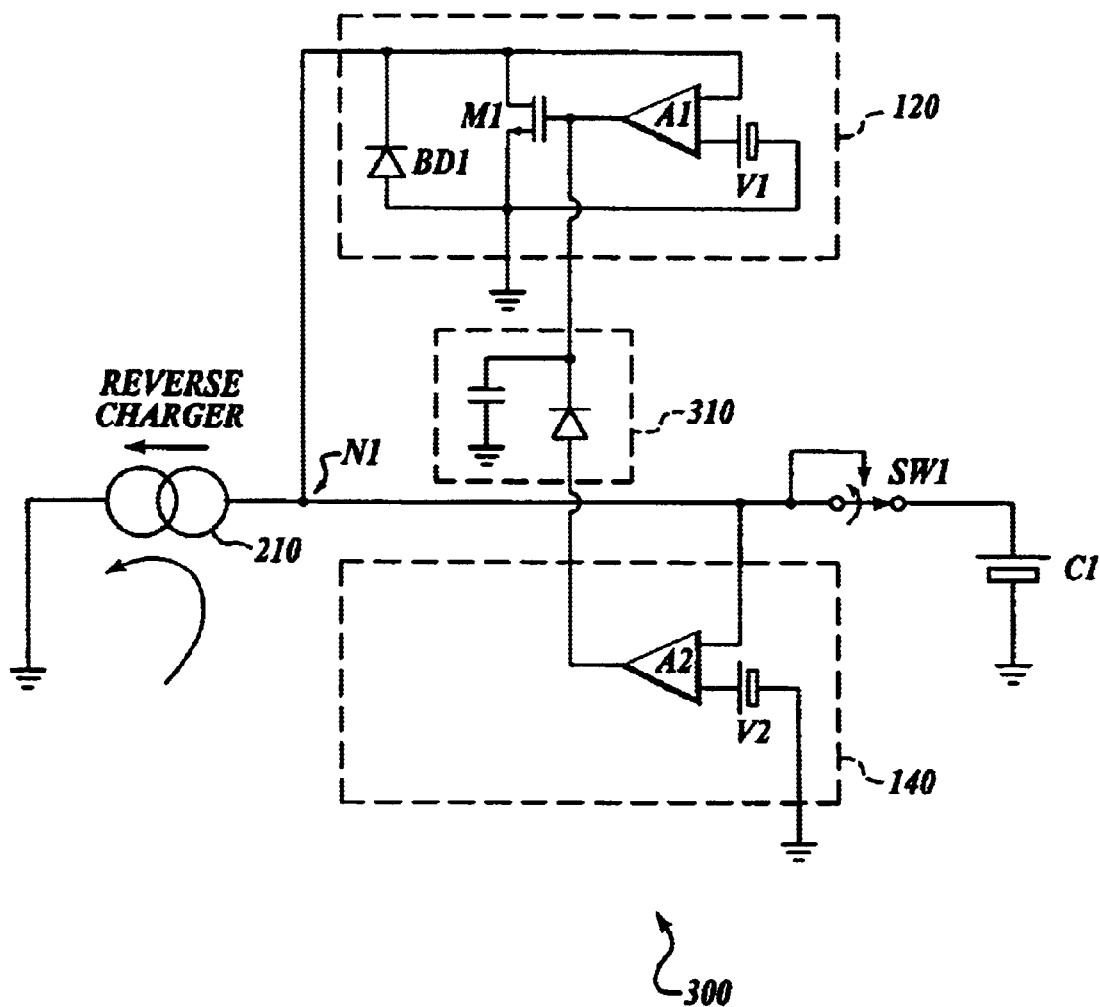
FIG. 3 shows a schematic diagram of another example reverse charger protection circuit 300 in accordance with the present invention.

FIG. 3 shows a schematic diagram of an example reverse charger protection circuit 300, where a single transistor M1 is controlled by the output of amplifiers A1 and A2. FIG. 3 is substantially the same as FIG. 2.

Although the reverse charger protection circuit is described herein according to a conventional negative ground system, the reverse charger protection circuit could be implemented by using a positive ground system.

The circuit of FIG. 3 includes an over-voltage protection circuit, a reverse-voltage protection circuit, cell C1, and switch circuit SW1. The over-voltage protection circuit includes transistor M1, body diode BD1, amplifier A1, and voltage reference V1. The reverse-voltage protection circuit includes transistor M2, body diode BD2, amplifier A2, and voltage reference V2. The reverse charger 210 is coupled between node N1 of reverse charger protection circuit 300 and ground. An optional timing circuit 310 is coupled between the outputs of amplifiers A1 and A2. (When timing circuit 310 is not elected, the outputs of amplifiers A1 and A2 remain coupled.) The association of the components with a named portion of the circuit is only given for the purpose of convenient reference in this discussion. Thus, the association of the components with the main portions of the circuit does not limit the operation or association of the components to those named portions.

In normal operation (i.e., when a proper legal charger is applied), over-voltage protection circuit 120 acts to prevent cell 130 from being overcharged. The voltage at node N1 is compared to the maximum-allowable forward-voltage as provided by voltage reference V1. An example maximum-allowable forward-voltage provided by voltage reference V1 for charging lithium ion cells is 4.4 V. Amplifier A1 compares the voltage present at node N1 against the maximum-allowable forward-voltage. Amplifier A1 activates transistor M1 such that current from node N1 is shunted to ground when the maximum-allowable forward-voltage is exceeded. Shunting current from node N1 to ground causes the voltage present at node N1 to decrease. When the voltage present at node N1 falls below the maximum-allowable forward-voltage, amplifier A1 deactivates transistor M1 such that current from node N1 is not shunted to ground. Amplifier A1 continues to monitor the voltage at node N1 and to shunt current as required. In other embodiments amplifier A1 operates in an analog feedback mode such that transistor M1 is dynamically biased so as to maintain a constant voltage at node N1.

When a reverse charger is coupled to node N1, latent parasitic devices such as body diode BD1 in the semiconductor substrate of over-voltage protection circuit 120 become forward-biased. Thermal damage or latchup may occur when the parasitic devices are forward-biased. For example, body diode BD1 will begin to conduct when the voltage of the anode of body diode BD1 exceeds the voltage of the cathode of body diode BD1 by an amount greater than the threshold voltage of body diode BD1. If the anode is at ground potential and the threshold voltage of body diode BD1 is 600 mV, body diode BD1 will start to conduct if the voltage at node N1 falls to −600 mV or below.

Reverse-voltage protection circuit 140 detects the presence of a negative voltage at node N1 that may cause thermal damage or latchup to parasitic devices. Amplifier A2 compares the voltage present at node N1 against the maximum-allowable reverse-voltage, as provided by voltage reference V2. If the maximum-allowable reverse-voltage is exceeded (i.e., more negative), amplifier A2 activates transistor M2 such that reverse current from node N1 is shunted to ground. Shunting current from node N1 to ground causes the negative voltage present at node N1 to increase (i.e., become less negative). When the voltage present at node N1 rises above the maximum-allowable reverse-voltage, amplifier A2 deactivates transistor M2 such that current from node N1 is not shunted to ground. Amplifier A2 continues to monitor the voltage at node N1 and to shunt current as required. Optional timing circuit 310 can be used to modify the output of amplifier A2, which is used to control transistor M1. Timing circuit 310 provides a cyclic timing signal for activation (and deactivation) of transistor M1. The cyclic timing signal has an activation duty cycle of greater than 50 percent during the time in which a negative voltage is present at node N1. Thus, the duty cycle of a body diode is less than 50 percent when timing circuit 310 is used to shunt current from the body diode.

In other embodiments amplifier A2 operates in an analog feedback mode wherein transistor M2 is biased so as to maintain a constant voltage at node N1. The maximum-allowable reverse-voltage is selected to ensure that the reverse-voltage protection circuit 140 prevents the voltage at node N1 from causing conduction in the parasitic devices. For example, if the expected forward-conduction threshold of typical reverse-biased parasitic semiconductor devices is around −600 mV, the maximum-allowable reverse-voltage may be set to −200 mV. A maximum-allowable reverse-voltage of −200 mV provides a margin of 400 mV for the reverse-voltage protection circuit 140 to use for responding to a reverse charger.

Figure 4:
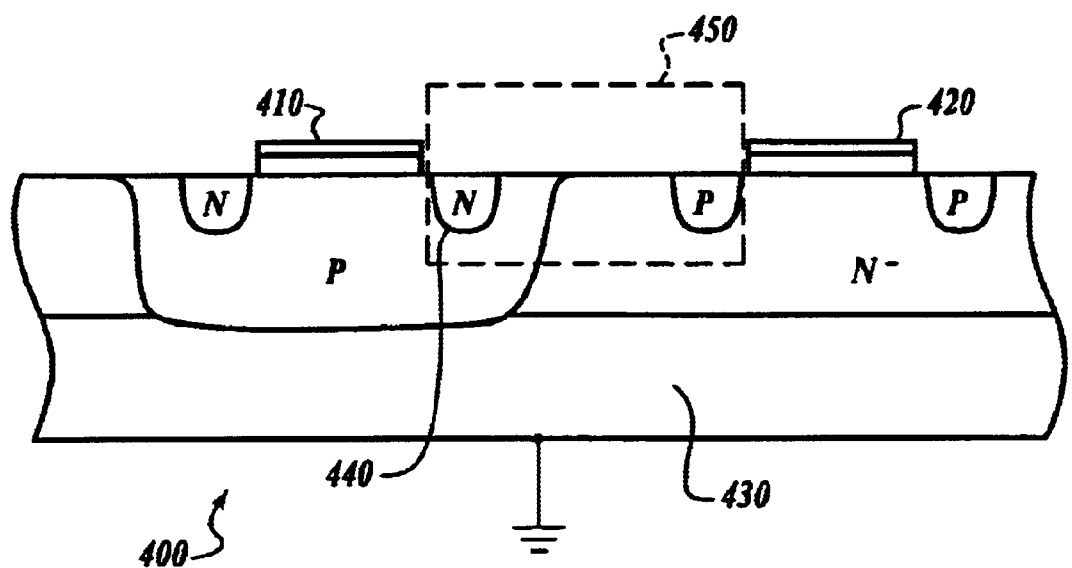
FIG. 4 is a cross-section of a portion of a charger protection circuit that illustrates example parasitic devices comprised by complementary MOS transistors in accordance with the present invention.

FIG. 4 is a cross-section of a portion of a charger protection circuit 400 that illustrates example parasitic devices comprised by complementary MOS transistors in accordance with the present invention. Transistor 410 is an example NMOS transistor for shunting current to ground. Transistor 420 is an example PMOS transistor that is adjacent to transistor 410. Transistors 410 and 420 are formed in substrate 430. When substrate 430 is P-type, substrate 430 is held at ground potential. PN junction 440 forms a parasitic body diode, for example, in the drain of transistor 410. Adjacent NPN and PNP devices in a portion 450 of the substrate form a parasitic SCR that may latch if the parasitic body diode starts to conduct. In another example embodiment, substrates that are of a type that is complementary to the described type may also be used in accordance with the instant invention by using voltage supplies that have an opposite polarity to those described. For example, when substrate 430 is N-type, substrate 430 may be held at Vdd.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for protecting a battery charger against a reverse-coupled cell, comprising:
   a charge input circuit arranged to provide a charging signal;
   a body diode that is located within an over-voltage protection circuit; and
   a reverse-voltage protection circuit that is arranged to detect the reverse-coupled cell and to prevent the charging signal from causing the body diode in the over-voltage protection circuit to conduct.

2. The apparatus of claim 1 further comprising a transistor that is arranged to shunt current from the charging signal when the reverse-voltage protection circuit detects the reverse-coupled cell.

3. The apparatus of claim 1 further comprising an amplifier that is arranged to detect when the charging signal exceeds a maximum-allowable reverse-voltage.

4. The apparatus of claim 1 further comprising:
   an amplifier that is arranged to detect when the charging signal exceeds a maximum-allowable reverse-voltage; and
   a transistor that is arranged to shunt current from the charging signal when the amplifier detects that the charging signal exceeds the maximum-allowable reverse-voltage.

5. The apparatus of claim 1 further comprising a switch circuit that is coupled between the charge input circuit and the reverse-coupled cell.

6. The apparatus of claim 1, wherein the body diode is formed by a drain-to-substrate junction of a transistor that is used by both the over-voltage protection circuit and the reverse-voltage protection circuit.

7. The apparatus of claim 1, wherein the reverse-voltage protection circuit prevents the charging signal from causing a parasitic SCR in the over-voltage protection circuit from latching.

8. The apparatus of claim 1, further comprising an over-voltage protection circuit that is coupled to the charging signal.

9. A method for protecting a charge input circuit from a high current flow that results when a reverse-voltage is applied to the charge input circuit, wherein the reverse-voltage results when a charger is reverse-coupled to a cell, comprising:
   comparing a voltage associated with the charging signal to a maximum-allowable reverse-voltage; and
   reducing the reverse-voltage of the charging signal when the maximum-allowable reverse-voltage is exceeded.

10. The method of claim 9, wherein reducing the reverse-voltage of the charging signal further comprises shunting current from the charging signal such that the reverse-voltage of the charging signal is reduced.

11. Method of claim 10, wherein shunting current form the charging signal further comprises using a transistor to reduce the reverse-voltage of the charging signal.

12. The method of claim 9, wherein reducing the reverse-voltage of the charging signal further comprises providing a cyclic timing signal for activating and deactivating a current shunt, wherein the cyclic timing signal has a activation duty cycle of greater than 50 percent.

13. The method of claim 9, further comprising selecting a voltage for the maximum-allowable reverse-voltage reference that is based on forward-conduction threshold voltages of parasitic devices that arc present in the charge input circuit.

14. The method of claim 9, further comprising preventing a body diode that is present in the charge input circuit from conducting as a result of reverse-coupling the cell to the charger.

15. The method of claim 9, fiber comprising preventing an SCR that is present in the charge input circuit from latching as a result of reverse-coupling the cell to the charger.

16. The method of claim 9, further comprising preventing a body diode and an SCR that are present in the charge input circuit from conducting as a result of reverse-coupling the cell to the charger.

17. An apparatus for protecting a charge input circuit from a high current flow that results when a reverse-voltage is applied to the charge input circuit, wherein the reverse-voltage results when a charger is reverse-coupled to a cell, comprising:
   means for comparing a voltage associated with the charging signal to a maximum-allowable reverse-voltage; and
   means for reducing the reverse-voltage of the charging signal when the maximum-allowable reverse-voltage is exceeded.

18. The apparatus of claim 17, wherein the means for reducing the reverse-voltage of the charging signal further comprises means for shunting current from the charging signal such that the reverse-voltage of the charging signal is reduced.

19. The apparatus of claim 18, wherein the means for shunting current from the charging signal further comprises a transistor for reducing the reverse-voltage of the charging signal.

20. The apparatus of claim 17, further comprising means for preventing a body diode that is present in the charge input circuit from conducting as a result of reverse-coupling the cell to the charger.

21. The apparatus of claim 17, further comprising means for preventing an SCR that is present in the charge input circuit from latching as a result of reverse-coupling the cell to the charger.

22. The apparatus of claim 17, further comprising means for preventing a parasitic body diode and a parasitic SCR that are present in the charge input circuit from conducting as a result of reverse-coupling the cell to the charger.

* * * * *